United States Patent
Oudalov et al.

(10) Patent No.: US 9,705,332 B2
(45) Date of Patent: Jul. 11, 2017

(54) ENERGY STORAGE SYSTEMS

(75) Inventors: Alexandre Oudalov, Fislisbach (CH); Mehmet Mercangoez, Stein (CH); Thomas Von Hoff, Niederrohrdorf (CH)

(73) Assignee: ABB Research LTD, Zurich (CH)

( * ) Notice: Subject to any disclaimer, the term of this patent is extended or adjusted under 35 U.S.C. 154(b) by 970 days.

(21) Appl. No.: 13/413,174

(22) Filed: Mar. 6, 2012

(65) Prior Publication Data

US 2012/0248873 A1 Oct. 4, 2012

Related U.S. Application Data

(63) Continuation of application No. PCT/EP2010/062878, filed on Sep. 2, 2010.

(30) Foreign Application Priority Data

Sep. 7, 2009 (EP) .................................... 09169608

(51) Int. Cl.
*H02J 7/00* (2006.01)
*H02J 3/32* (2006.01)

(52) U.S. Cl.
CPC ............ *H02J 3/32* (2013.01); *Y10T 307/549* (2015.04)

(58) Field of Classification Search
USPC ........................................................ 320/135
See application file for complete search history.

(56) References Cited

U.S. PATENT DOCUMENTS

| | | | |
|---|---|---|---|
| 2003/0184307 A1 | 10/2003 | Kozlowski et al. | |
| 2004/0201362 A1* | 10/2004 | Borrego Bel | H02J 7/1423 320/104 |
| 2004/0263116 A1 | 12/2004 | Doruk et al. | |
| 2005/0040789 A1 | 2/2005 | Salasoo et al. | |

(Continued)

FOREIGN PATENT DOCUMENTS

| WO | WO 03/071617 A2 | 8/2003 |
|---|---|---|
| WO | WO 2008/039725 A2 | 4/2008 |

OTHER PUBLICATIONS

International Search Report (PCT/ISA/210) issued on Oct. 28, 2010, by European Patent Office as the International Searching Authority for International Application No. PCT/EP2010/062878.

(Continued)

*Primary Examiner* — Robert Grant
(74) *Attorney, Agent, or Firm* — Taft Stettinius & Hollister LLP (57) ABSTRACT

A method for controlling an energy storage system for connection to a power system, and such an energy storage system are provided. The method makes use of a model based predictive controller to optimize the charging/discharging rates of energy storage elements in a hybrid energy storage system. The method includes determining respective desired charging/discharging rates for the energy storage elements in dependence upon state of charge predictions from respective models of the storage elements, using model predictive control, and adjusting respective charging/discharging rates of the storage elements in accordance with the determined rates. The energy system includes a controller configured to control respective charging/discharging rates of the energy storage elements in accordance with the method.

36 Claims, 5 Drawing Sheets

(56) References Cited

U.S. PATENT DOCUMENTS

| | | | |
|---|---|---|---|
| 2006/0284617 A1 | 12/2006 | Kozlowski et al. | |
| 2008/0040296 A1* | 2/2008 | Bridges et al. | 705/412 |
| 2008/0245587 A1* | 10/2008 | Sastry | B60K 6/28 |
| | | | 180/65.29 |
| 2010/0090525 A1* | 4/2010 | King | B60L 11/1868 |
| | | | 307/10.1 |

OTHER PUBLICATIONS

European Search Report dated Apr. 22, 2010 for European Application No. 09169608.8.

International Preliminary Report on Patentability (PCT/IPEA/409) issued Sep. 21, 2011, by European Patent Office as the International Examining Authority for International Application No. PCT/EP2010/062878.

\* cited by examiner

ENERGY STORAGE SYSTEMS

RELATED APPLICATIONS

This application claims priority as a continuation application under 35 U.S.C. §120 to PCT/EP2010/062878, which was filed as an International Application on Sep. 2, 2010 designating the U.S., and which claims priority to European Application 09169608.8 filed in Europe on Jul. 9, 2009. The entire contents of these applications are hereby incorporated by reference in their entireties.

FIELD

The present disclosure relates to energy storage systems (ESS) and to power distribution systems including energy storage systems.

BACKGROUND INFORMATION

An electric power system requires that aggregate electric power production and consumption must be matched instantaneously and continuously, and that all system elements should operate within acceptable limits. Unexpected loss of generating units or transmission lines, or errors in daily load forecast, result in sudden imbalances between electric power generation and consumption. Such imbalances lead to frequency deviations from the nominal frequency of the power system (e.g., 50 Hz in Europe and 60 Hz in the U.S.). This is problematic because generators may get disconnected by over- or under-frequency protection systems and cause even larger deviations leading to a system blackout. Loads, such as synchronous rotating machines, need to operate at constant speed (frequency), and therefore, large frequency deviations may result in the interruption of various manufacturing processes.

An energy storage system (ESS) can be an effective means of alleviating these known problems. The ESS can function as a supplier of balancing power and energy reserves. An ESS may absorb power from the grid when the actual frequency is above a defined frequency tolerance band thereby charging the storage device, and an ESS may provide power back to the grid when the actual frequency is below the frequency tolerance band, in that case discharging the storage device.

As the growing size and number of power outages demonstrate, energy storage systems (ESSs) can be crucial for preventing the tremendous losses associated with momentary or prolonged power failures. In addition, an amount of large poorly dispatched renewable power plants (RPP) such as wind and solar is growing. At the same time, the dispatchable share of generation is strongly decreasing. More power and energy reserves are needed to guarantee a stable and secure operation of power systems due to the intermittent nature of renewable power plants which increases the carbon footprint of the energy supply system. Usage of a central ESS(s) based on a specific storage technology is well known and is typically used for a specific targeted application.

For example, flywheels and some batteries are limited to high power applications where EnergyESS[W*hours]<PowerESS[W]*t[hours] (e.g., for primary frequency control t is usually in the range of 0.1-1 hours) while pumped-hydro, compressed-air and thermo-electric energy storage are most suitable for high energy applications where EnergyESS>PowerESS*t (e.g., dispatching of renewables generation, arbitrage (day/night energy trading) and load levelling where t is above 1 hour). The first mentioned group of ESS technologies may have response times of less than one second, whereas the ESS technologies that are suitable for high energy applications generally have slower response times of 10 seconds or more.

A hybrid-ESS is a combination of fast and slow responding modules based on different energy storage technologies. Such a combination allows Hybrid-ESS to cover a full spectrum of utility scale applications from seconds to hours. For example, a Hybrid ESS may consist of a flywheel and flow battery or combine a lithium-ion battery and thermo-electric energy storage. A Hybrid-ESS may be configured in several different ways and includes a central stationary system in which both fast and slow reacting energy storage components are at the same location, a distributed stationary system in which single/multiple fast and slow reacting energy storage component(s) are situated in different locations, and a distributed stationary/mobile system in which a large number of fast reacting energy storage component are mobile.

In the case of a distributed Hybrid-ESS, grid constraints, which impact system reliability, must be taken into account when the energy is exchanged between remote components. Using a large number of mobile fast reacting modules (e.g., plug-in hybrid electric or fully electrical vehicles) may resolve transmission constraints since electric energy is moved from one area to another by means of conventional roads.

For example, if a Hybrid-ESS is used for dispatching a wind power plant using a stationary centralized fast and slow reacting modules, the slow reacting module is used to smooth slow power output fluctuations and for level the loading through the transmission line which links the renewable power plant (RPP) with the transmission grid. The fast reacting module is used to smooth fast renewable power fluctuations (e.g., wind gusts) and for fast network control services (primary frequency control). A Hybrid-ESS yields more flexibility and, hence, contributes to the benefit of ESS owner in various forms:

(i) Extension of provided services/number of utility scale applications; and (ii) Exchange energy between fast and slow reacting ESS components (in periods when the fast component is at or anticipated to reach soon the operating limits) for minimizing operating cost.

These benefits can be achieved via a coordinated, optimally controlled charging/discharging process of fast and slow modules of the Hybrid-ESS. This process is mainly based on tracking of respective actual States of Charge (SoC) of the Hybrid-ESS modules. The actual SoC indicates how much energy can be provided to or absorbed from the grid by a module. When the SoC of a fast reacting module reaches or is anticipated to reach an upper or lower boundary value, the control system initiates energy exchange between fast and slow modules depending on ESS model predictions, power system forecasts, system constraints and optimal control objectives.

In WO2008/039725, a system is described which provides automated means to generate power and distribute locally generated power to a multiplexed array of energy storage devices in a dynamic manner. The system, when utilizing dynamic algorithms, aims to deal with the complex demands of often conflicting energy storage device requirements and real-time demand loads in conjunction with dynamic switching between energy storage devices to enhance the performance and effectiveness that is beneficial to both the aggregate energy efficiency and the individual owner demands of each energy storage device.

U.S. 2004/0263116 describes a distributed ESS which aims to store electrical energy close to the point of use. These storage nodes can communicate with a central clearing entity to determine whether the nodes should buy energy for storage, provide energy to the user, or sell power back to the grid. The function will depend, for example, on the amount of energy stored in the node, the cost of the electrical energy and peak power, and the price of resold energy/power.

Existing ESS control systems use real-time measurements of controlled parameters, predefined reference values and a predetermined control regime to control the use of the ESS or Hybrid-ESS. Such systems can be somewhat limited in their ability to provide suitable control for a complex hybrid ESS.

In view of the above, the present disclosure provides a system and method which utilize a set of techniques that can provide improved control performance for a hybrid ESS operation.

SUMMARY

An exemplary embodiment of the present disclosure provides a method for controlling an energy storage system for connection to a power system. The energy storage system includes a first energy storage element and a second energy storage element having a first operational characteristic and a second operational characteristic, respectively. The first operational characteristic is a slow energy storage and the second operational characteristic is a fast energy storage. The exemplary method includes determining respective desired charging/discharging rates for the first and second energy storage elements in dependence upon state of charge predictions from respective models of the first and second storage elements, using model predictive control, and adjusting respective charging/discharging rates of the first and second storage elements in accordance with the determined rates.

An exemplary embodiment of the present disclosure provides an energy storage system for connection to a power system. The exemplary energy storage system includes a first energy storage element having a first operational characteristic, where the first energy storage element includes a slow energy storage system element. The exemplary energy storage system also includes a second energy storage elements having a second operational characteristic, where the second storage element includes a fast energy storage system element. In addition, the exemplary energy storage system includes a controller configured to control respective charging/discharging rates of the first and second energy storage elements by determining respective desired charging/discharging rates for the first and second energy storage elements in dependence upon state of charge predictions from respective models of the first and second storage elements, using model predictive control, and adjusting respective charging/discharging rates of the first and second storage elements in accordance with the determined rates.

DETAILED DESCRIPTION

Exemplary embodiments of the present disclosure are concerned with providing operating strategies for a Hybrid-ESS that delivers an optimal charging-discharging schedule between ESS modules and a power system, and between fast and slow reacting ESS modules from an economical point of view including:

(i) a benefit from providing utility scale application (e.g., frequency regulation, load levelling, integration of renewable energy sources, etc.);

(ii) a benefit from exchanging low cost energy between fast and slow reacting ESS modules; and (iii) an optimized Hybrid-ESS operation allows for a reduction in the dimension of modules in the design phase, for example, the system can achieve its targets at minimal investment cost.

According to an exemplary embodiment of the present disclosure, a method is provided for controlling an energy storage system for connection to a power system, where the energy storage system includes first and second energy storage elements having first and second operational characteristics, respectively. The exemplary method includes determining respective desired charging/discharging rates for the first and second energy storage elements in dependence upon respective models of the first and second storage elements, using model predictive control, and adjusting respective charging/discharging rates of the first and second storage elements in accordance with the determined rates.

According to an exemplary embodiment of the present disclosure, a method is provides for controlling an energy storage system, in which the exemplary method makes use of a model based predictive controller.

According to an exemplary embodiment of the present disclosure, a method is provided for controlling an energy storage system for connection to a power system, where the energy storage system includes first and second energy storage elements having first and second operational characteristics, respectively. The exemplary method includes determining a predicted state of charge of each of the storage elements from respective models thereof, receiving a time dependent forecast relating to properties of the storage elements and of the power system, determining respective desired charging/discharging rates for the first and second storage elements in dependence upon the respective predicted states of charge for the elements, and upon the time dependent forecast, adjusting the respective charging/discharging rates for the elements in accordance with the determined charging/discharging rates.

According to an exemplary embodiment of the present disclosure, there is provided an energy storage system for connection to a power system. The energy storage system includes first and second energy storage elements having first and second operational characteristics, respectively, and a controller for controlling respective charging/discharging rates of the first and second energy storage elements. The controller is configured to operate in accordance with a method according to any of the exemplary embodiments of the present disclosure.

The controller serves to optimize performance of slow and fast reacting energy storage modules in different utility scale applications. The control method is applicable to various slow and fast reacting energy storage technologies, for example, batteries, flywheels, super/ultra-capacitors, thermo-electric and compressed-air energy storage, etc., where a dispatching/keeping of SoC in a certain operating range is a critical process for a successful operation.

According to an exemplary embodiment of the present disclosure, a power distribution system is provided which includes such an energy storage system.

Figure 1:
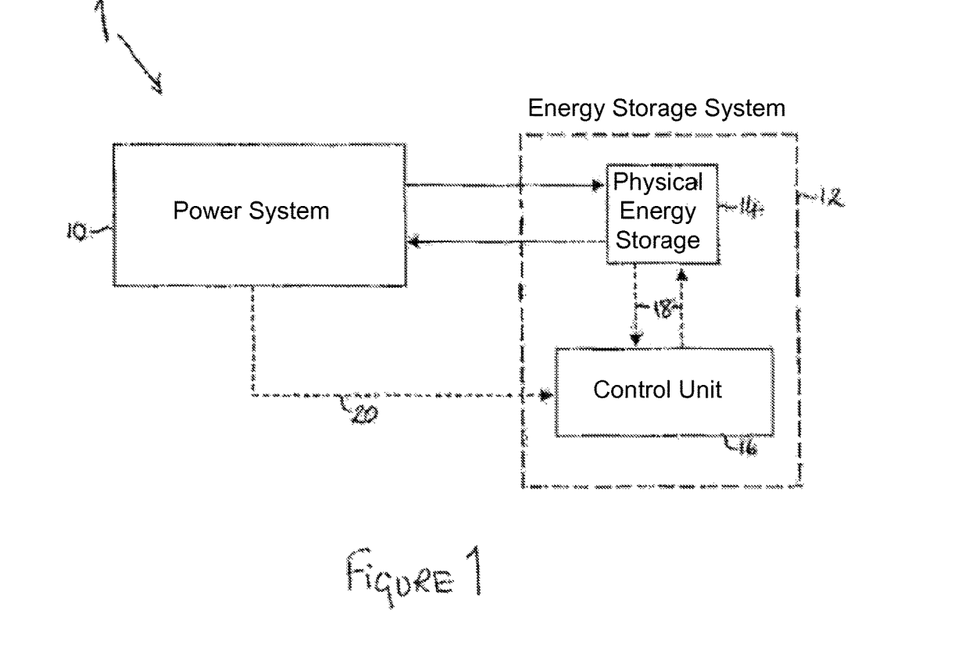
FIG. 1 illustrates schematically an electrical power system architecture according to an exemplary embodiment of the present disclosure.

FIG. 1 illustrates an electrical power system architecture 1 which includes a power system 10 and an energy storage system (ESS) 12. The power system 10 is in connection with the ESS 12 such that power can be transferred between them. The ESS 12 includes a physical energy storage unit 14 and a control unit 16 which are in bidirectional communication 18 with each other. A further communication link 20 is located between the power system 10 and the control unit 16.

In operation, the communication link 20 between the power system 10 and the control unit 16 functions to provide information on the state of the power system 10 to the control unit 16. The information can include details of the frequency of operation, the load, and the voltage of the power system. This information may be provided by a sensing unit in the power system itself, or by a sensing unit in the ESS 12. The control unit 16 serves to control the ESS 12 in order to maximize or optimize a number of predetermined parameters, as will be described in detail below.

The energy storage unit 14 includes at least one sensor that measures at least one parameter of the energy storage unit 14, and a communication device which serves to transmit parameter information to the control unit 16, via the communication link 18. The sensors provided in the storage unit 14 can provide information about the state of charge of the unit 14, for example, several methods of estimating the state of charge of a battery have been used. Some are specific to particular cell chemistries. Most depend on measuring some convenient parameter which varies with the state of charge, for example, voltage, current, internal impedance, concentration of the electrolyte, etc. Additional temperature sensors improve the accuracy of state of charge calculation.

Figure 2:
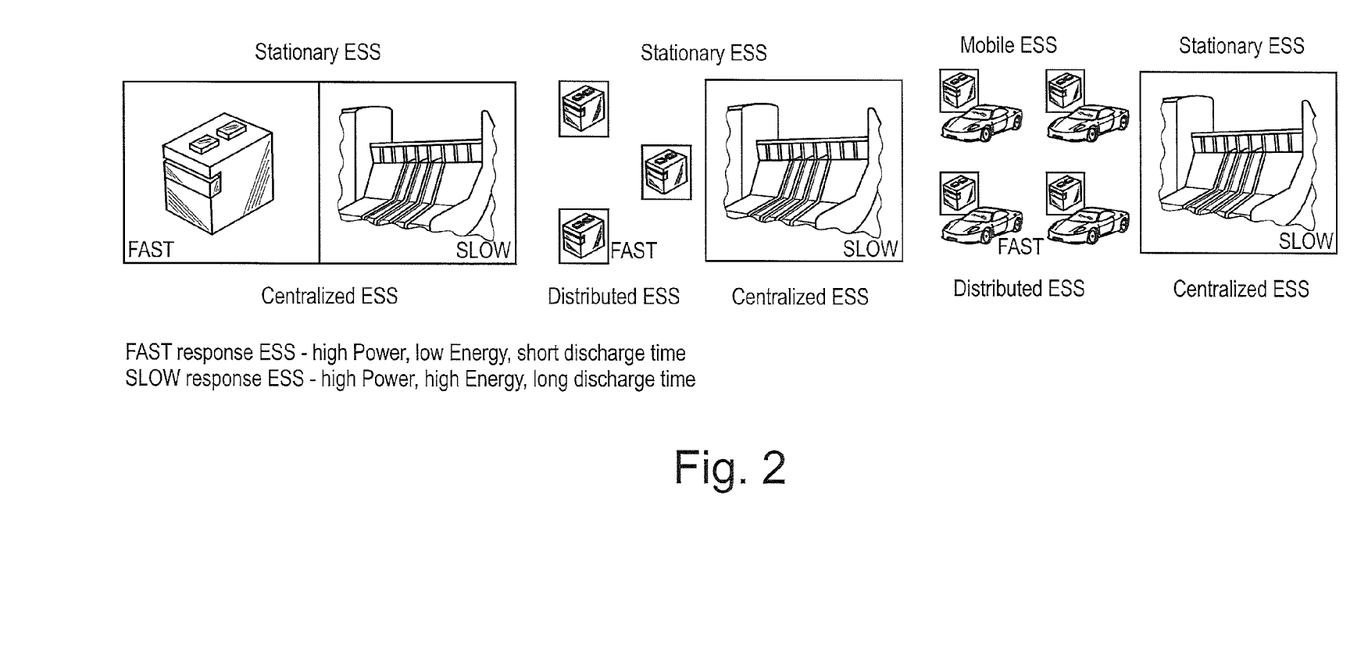
FIG. 2 illustrates schematically a hybrid ESS according to an exemplary embodiment of the present disclosure.

The ESS of FIG. 1 can be provided by a Hybrid-ESS, for example, as shown in FIG. 2. For example, stationary slow reacting and fast reacting storage devices are situated in the same location. Alternatively, the fast reacting storage and/or slow reacting storage devices can be distributed at multiple stationary locations. Another alternative is to have mobile fast reacting storage devices, again with a centralized or de-centralized stationary slow reacting device. In all cases, communication between the ESS controller and all fast and slow reacting energy storage components is required.

The communication between the storage devices (slow and fast elements) and the central controller (situated in the Hybrid-ESS control room) is provided by reliable, fully available communication links.

Figure 3:
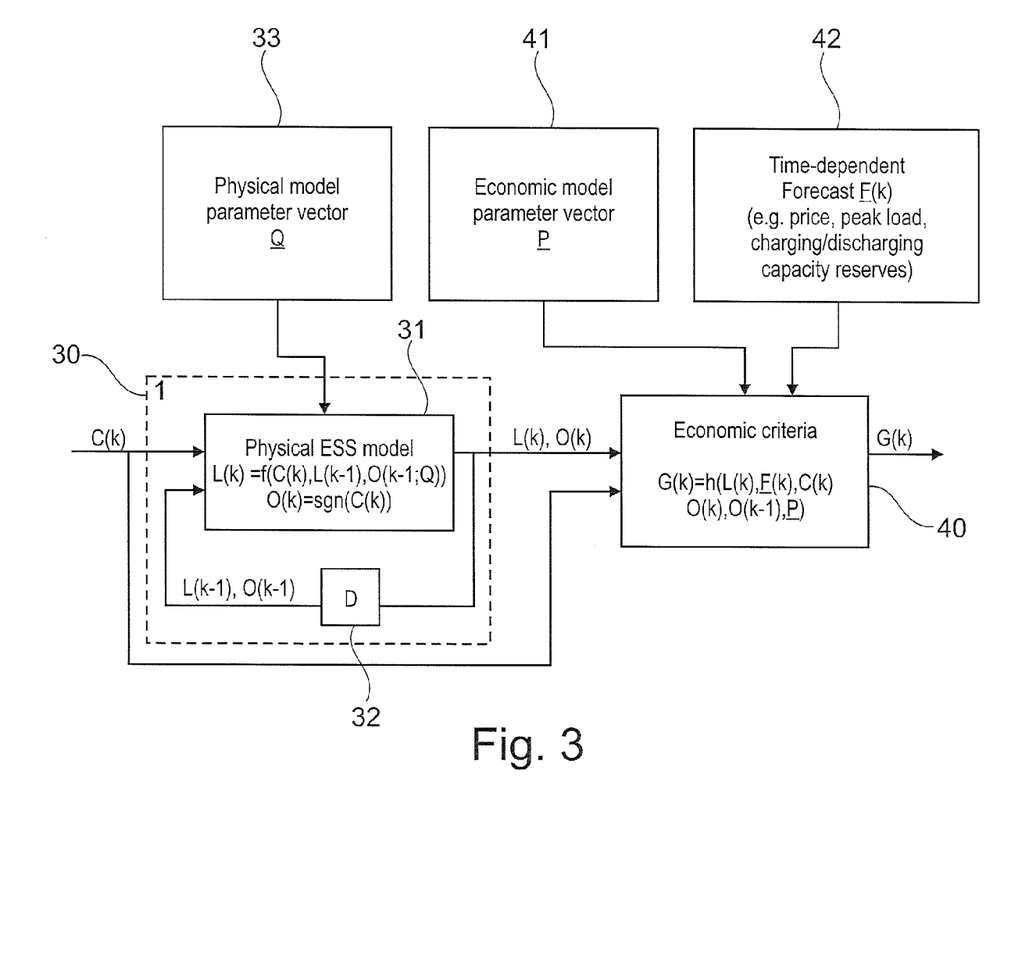
FIG. 3 illustrates schematically a control function of an ESS according to an exemplary embodiment of the present disclosure.

FIG. 3 illustrates a model for use in optimizing operation of an ESS, according to an exemplary embodiment of the present disclosure. A physical energy storage system is modelled 30 using a physical ESS model 31 and a time delayed feedback loop 32, in which $L(k)$ is the storage level at time k, and D is a one step time delay. The physical ESS model is parameterized by a parameter vector Q 33 which describes, for example, charge/discharge efficiency, and storage efficiency. A physical ESS model is provided for each of the energy storage element provided in the system, such that the required charging/discharging rates can be determined for each element.

The manipulated variable of the physical ESS model is the charge/discharge rates of the elements in the Hybrid-ESS ($C(k)[kW]$). The states of the model includes the charge level $L(k)$ and the current charge operation mode $O(k)$.

A second part of the model is an economic model 40 which operates to evaluate the gain of the ESS over the predicted period for a charging rate sequence $C(k)$. It considers static economic model parameters, for example, lifecycle cost (changing from charge to discharge, depth of discharge, etc.), gathered in the parameter vector P 41 and time-varying parameters 42 such as the forecast of energy price and load levels, which are gathered in the parameter sequence $F(k)$. The ultimate task of the economic control model is to find a control sequence $[C(k), C(k+1), C(k+M-1)]$ for the ESS that maximizes the total profit (sum of $G(k)+ \ldots +G(k+M-1)$, thereby determining an optimal sequence over a horizon of M steps. From this sequence, the first control input is executed. At time k+1, a new optimal sequence for $[C(k+1), \ldots, C(k+M)]$ is determined taking into account new boundary conditions.

The model predictive control and optimization tasks described above are arranged in three distinct groups and carried out at three distinct rates, to provide a multi-rate model predictive controller (MRMPC) for controlling the ESS.

The least frequently carried out task is the optimization of the economic model with the inputs indicated in FIG. 3, and described above. The optimization objective is the maximization of the total profit, and the constraints are the steady state relationships among the physical ESS models, as well as the upper and lower state of charge limits and external limits or contracts on the power exchange between the grid and the Hybrid-ESS. The output of the economic optimization task are the desired charge level profiles $Lset(k)$, $Lset(k+1), \ldots, Lset(k+M)$ for the elements of the Hybrid-ESS. As an example, the execution period for this task could be in the range 1 to 15 minutes.

The second task involves the determination of the charge/discharge rates $[C(k), \ldots, C(k+M)]$ for the slow ESS elements of the Hybrid-ESS. This task involves the optimization of the Physical ESS model for the slow components with the inputs shown in FIG. 3 with the objective to achieve the desired charge level profiles $Lset(k), Lset(k+1), \ldots, Lset(k+M)$ as determined in the economic optimization for both the slow and the fast components of the Hybrid-ESS. The execution period of this task depends on the dynamics of the slow ESS components but will be faster than the economic optimization (for example, 15 to 60 seconds).

The third task is the determination of the charge/discharge rates $[C(k), \ldots, C(k+M)]$ for the fast ESS elements of the Hybrid-ESS. When the Hybrid-ESS system is used for frequency regulation applications, this task needs to have access to frequency measurements from the power system. The calculations for this task will minimize the difference between the frequency predictions and the desired frequency value, by taking into account the Physical ESS model for the fast components and the SoC constraints. This task has the highest execution frequency, for example, being carried out every 1 to 5 seconds.

Figure 4:
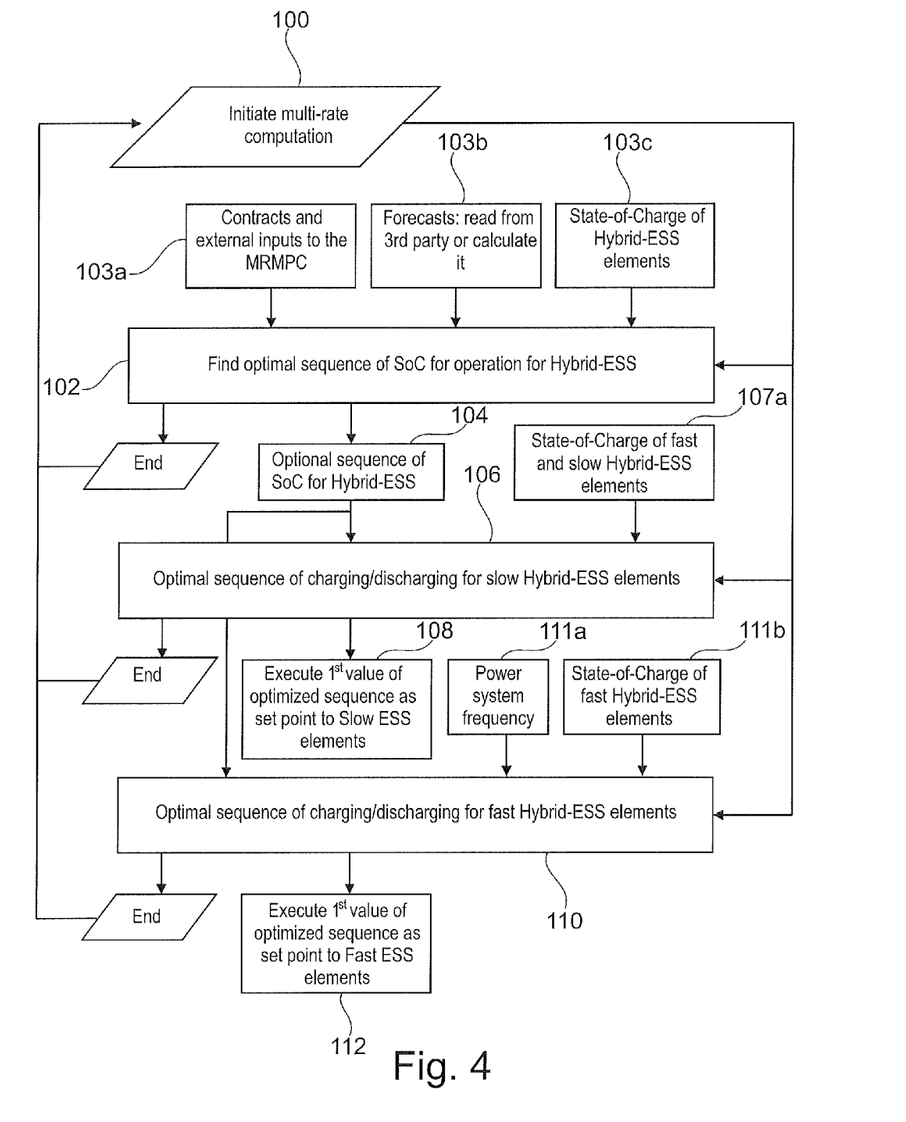
FIG. 4 illustrates steps in a method according to an exemplary embodiment of the present disclosure.

FIG. 4 illustrates steps in a method according to an exemplary embodiment of the present disclosure, and begins at step 100 with the initiation of the multi rate model predictive control. At step 102, an optimal sequence of SoC for the operation of the hybrid-ESS is determined, from several inputs 103a, 103b, and 103c. These inputs represent contracts and external inputs to the controller, calculated or obtained forecasts, and the current SoC for the ESS elements.

The output sequence 104 is supplied, along with the current SoC (107a) for the Hybrid-ESS elements, to the next step 106 in which the optimal sequence of charging/discharging for the slow ESS is determined. The first value of this sequence is executed at step 108 in order to provide a set point for the slow ESS elements.

At step 110, an optimal sequence of charging/discharging for the fast ESS is determined, for example, using inputs 104, 111a and 111b—the optimal sequence of SoC of Hybrid-ESS, the power system frequency, and the SoC of the fast ESS elements.

At step 112, the first value of this sequence is executed in order to provide the next set point for the fast ESS elements.

The steps described above, and illustrated in FIG. 4, are repeated for the next time step, with possibly changed boundary conditions for that next time step.

Figure 5:
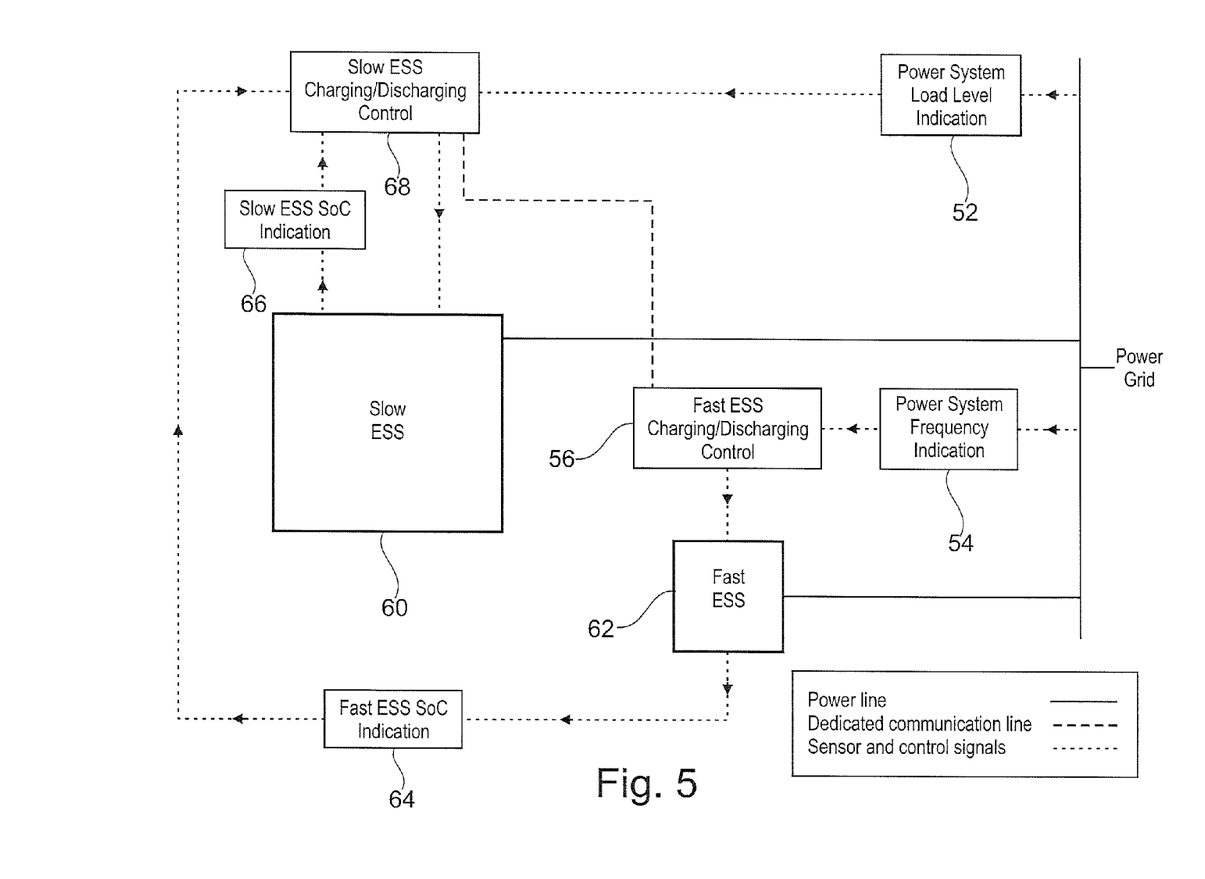
FIG. 5 illustrates a hybrid energy storage system according to an exemplary embodiment of the present disclosure.

When the ESS under consideration is of the hybrid type, the control and optimization tasks assumed by the model predictive control system include the coordination of two major components, namely the fast reacting ESS and the slow reacting ESS. In accordance with an exemplary embodiment, when the fast and slow reacting ESS components have a common point of coupling to the power system, the fast reacting ESS can be used exclusively for utility applications where a fast response is a prerequisite such as system frequency control, and the slow reacting ESS can be used to maintain the required state of charge (SoC) in the fast ESS and also provides applications where reacting time is not critical but energy capacity is of high importance, for example, load levelling, arbitrage, dispatching of renewable generation, etc. This arrangement is depicted in FIG. 5, in which a power grid 50 is measured to provide load level indication 52, and frequency indication 54. Slow ESS elements 60 are controlled using a controller 68 (corresponding to steps 102 and 106 in FIG. 4), which receives the load level indication 52 and slow ESS element SoC indication 66 as inputs.

Fast ESS elements 62 are controlled using a controller 56 (corresponding to step 110 in FIG. 4) which receives the grid frequency indication 54 as an input.

In FIG. 5, the control systems obtain information about the state of the power grid through sensors, communication, or prediction/estimation means. A common point of coupling with the power system enables the decoupling of frequency control action by the Hybrid-ESS arrangement on the power grid from the internal SoC control actions between the different ESS options. In FIG. 5 only two energy storage elements 60 and 62 are indicated. However, the depicted arrangement can be extended to include any number of local ESS units of different types. The system in the example of FIG. 5 makes use of the previously described model predictive control (MPC) system to coordinate the frequency and SoC control actions. The MPC system can also be combined with fast acting feedback and feedforward controllers for the regulation of individual ESS sub-systems. In such an arrangement, the MPC system will provide set points and limits for the lower complexity control loops. The control elements and actuators not shown in FIG. 5 can be different for different types of energy storage technologies, but the ESSs employed in an exemplary embodiment should be controllable with the allocated control elements and actuators. It should be also noted that means of information exchange are provided between elements 68 and 56 in accordance with algorithm depicted in FIG. 4.

Economic optimization of operation of Hybrid-ESS with the purpose of providing a wide spectrum of utility scale applications (from seconds to hours) such as: Load levelling, Frequency regulation, Arbitrage, Peak load shaving, and Dispatching of renewable power generation.

Time dependent forecast used in economic optimization of operation of Hybrid-ESS can be based on historical data, generated by an external application, and/or generated by a black-box model running as an on-line estimator and predictor.

Exemplary embodiments of the present disclosure were generally described above with regard to structural components and the functions such components perform. Any of the above-described structural components may include a computer processing device having a processor (e.g., a general purpose processor or application-specific processor) configured to execute an appropriately configured computer program which is tangibly recorded on a non-transitory computer-readable recording medium (e.g., any type of non-transitory, non-volatile memory) and which includes instructions for causing the processor to carry out the functions which such structural components are described to perform.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for controlling a hybrid energy storage system for connection to a power system, wherein:
   the hybrid energy storage system includes a first energy storage element and a second energy storage element;
   the first energy storage element is configured to absorb power from a grid and provide power back to the grid;
   the first energy storage element having a charging/discharging rate such that the first energy storage element is charged and discharged as the first energy storage element absorbs power from the grid and provides power back to the grid, respectively;
   the second energy storage element is configured to absorb power from the grid and provide power back to the grid;
   the second energy storage element having a charging/discharging rate such that the second energy storage element is charged and discharged as the second energy storage element absorbs power from the grid and provides power back to the grid, respectively;
   the first energy storage element and the second energy storage element having a first operational characteristic and a second operational characteristic, respectively, wherein the first operational characteristic is a slow energy storage and the second operational characteristic is a fast energy storage, the method comprising:
   determining respective desired charging/discharging rates for the first and second energy storage elements in dependence upon state of charge predictions from respective models of the first and second storage elements, using model predictive control; and adjusting respective charging/discharging rates of the first and second storage elements in accordance with the determined rates, thereby exchanging energy between the first energy storage element and the second energy storage element.

2. A method as claimed in claim 1, wherein the respective models of the first and second storage elements are operable to determine a state of charge of the corresponding storage element.

3. A method as claimed in claim 1, wherein the respective desired charging/discharging rates are determined in dependence upon the respective models of the first and second storage elements, and upon a time dependent forecast of properties of the first and second storage elements and of the power system.

4. A method as claimed in claim 1, comprising:
determining a predicted state of charge of each of the storage elements from the respective models thereof;
receiving a time dependent forecast relating to properties of the storage element and of the power system;
determining respective desired charging/discharging rates for the first and second storage elements in dependence upon the respective predicted states of charge for the first and second storage elements, and upon the time dependent forecast;
adjusting the respective charging/discharging rates for the first and second storage elements in accordance with the determined charging/discharging rates.

5. A method as claimed in claim 1, wherein the determining of the respective charging/discharging rates comprises determining a charging/discharging rate sequence.

6. A method as claimed in claim 1, wherein the charging/discharging rage for the first storage element is determined less frequently than the charging/discharging rate for the second storage element.

7. A hybrid energy storage system for connection to a power system, the hybrid energy storage system comprising:
a first energy storage element having a first operational characteristic, the first energy storage element including a slow energy storage system element;
the first energy storage element is configured to absorb power from a grid and provide power back to the grid;
the first energy storage element having a charging/discharging rate such that the first energy storage element is charged and discharged as the first energy storage element absorbs power from the grid and provides power back to the grid, respectively;
a second energy storage element having a second operational characteristic, the second storage element including a fast energy storage system element;
the second energy storage element is configured to absorb power from the grid and provide power back to the grid;
the second energy storage element having a charging/discharging rate such that the second energy storage element is charged and discharged as the second energy storage element absorbs power from the grid and provides power back to the grid, respectively; and
a controller configured to control respective charging/discharging rates of the first and second energy storage elements by:
determining respective desired charging/discharging rates for the first and second energy storage elements in dependence upon state of charge predictions from respective models of the first and second storage elements, using model predictive control; and adjusting respective charging/discharging rates of the first and second storage elements in accordance with the determined rates in order to exchange energy between the first energy storage element and the second energy storage element; and wherein the controller is further configured to initiate energy exchange between the first energy storage element and the second energy storage element when the second energy storage element is at or anticipated to soon reach an operating limit.

8. A hybrid energy storage system as claimed in claim 7, wherein the controller comprises a combination of central and distributed controllers.

9. A hybrid energy storage system as claimed in claim 8, wherein the slow energy storage system element has a slow reaction time of at least ten seconds, and the fast energy storage element has a short reaction time and is configured to reach a high output in less than one second.

10. A hybrid energy storage system as claimed in claim 7, wherein the controller includes a model storage unit configured to store data relating to the respective models of the first and second storage elements.

11. A hybrid energy storage system as claimed in claim 7, wherein each of the first and second energy storage elements respectively includes:
at least one sensor configured to detect at least one operating parameter of the energy storage element concerned; and
a communication device configured to receive operating parameter information from the at least one sensor, transmit the received operating parameter information to the controller, and receive control information from the controller.

12. A hybrid energy storage system as claimed in claim 7, comprising at least one of a plurality of the first energy storage elements and a plurality of the second energy storage elements.

13. A hybrid energy storage system as claimed in claim 12, wherein at least one of the plurality of first energy storage elements and the plurality of second energy storage elements is distributed by location.

14. A hybrid energy storage system as claimed in claim 7, comprising:
a sensing unit configured to detect an operating parameter of the power system to which the energy storage system is connected.

15. A method as claimed in claim 2, wherein the respective desired charging/discharging rates are determined in dependence upon the respective models of the first and second storage elements, and upon a time dependent forecast of properties of the first and second storage elements and of the power system.

16. A method as claimed in claim 15, wherein the determining of the respective charging/discharging rates comprises determining a charging/discharging rate sequence.

17. A method as claimed in claim 3, wherein the determining of the respective charging/discharging rates comprises determining a charging/discharging rate sequence.

18. A method as claimed in claim 4, wherein the determining of the respective charging/discharging rates comprises determining a charging/discharging rate sequence.

19. A method as claimed in claim 18, wherein the charging/discharging rate for the first storage element is determined less frequently than the charging/discharging rate for the second storage element.

20. A hybrid energy storage system as claimed in claim 9, wherein the controller includes a model storage unit configured to store data relating to the respective models of the first and second storage elements.

21. A hybrid energy storage system as claimed in claim 20, wherein each of the first and second energy storage element respectively includes:
at least one sensor configured to detect at least one operating parameter of the energy storage element concerned; and
a communication device configured to receive operating parameter information from the at least one sensor, transmit the received operating parameter information to the controller, and receive control information from the controller.

22. A hybrid energy storage system as claimed in claim 21, comprising at least one of a plurality of the first energy storage elements and a plurality of the second energy storage elements.

23. A hybrid energy storage system as claimed in claim 22, wherein at least one of the plurality of first energy storage elements and the plurality of second energy storage elements is distributed by location.

24. A hybrid energy storage system as claimed in claim 20, comprising: a sensing unit configured to detect an operating parameter of the power system to which the energy storage system is connected.

25. A power distribution system comprising: the hybrid energy storage system as claimed in claim 7; and a power system connected to the hybrid energy storage system.

26. A method as claimed in claim 1, wherein the respective models comprise models of the storage elements parameterized by at least one of charge/discharge efficiency and a storage efficiency.

27. A hybrid energy storage system as claimed in claim 7, wherein the respective models comprise models of the storage elements parameterized by a least one of a charge/discharge efficiency and a storage efficiency.

28. A method as claimed in claim 1, wherein the first storage element is a high energy storage element comprising one of a pumped-hydro energy storage, a compressed-air energy storage, and a thermo-electric energy storage.

29. A hybrid energy storage system as claimed in claim 7, wherein the first storage element is a high energy storage element comprising one of a pumped-hydro energy storage, a compressed-air energy storage, and a thermo-electric energy storage.

30. A method as claimed in claim 28, wherein the second storage element comprises one of a flywheel and a battery.

31. A hybrid energy storage system as claimed in claim 29, wherein the second storage element comprises one of a flywheel and a battery.

32. A method as claimed in claim 1, wherein the control system initiates energy exchange between the first energy storage element and the second energy storage element to maintain a required state of charge in the second energy storage element.

33. A hybrid energy storage system as claimed in claim 7, wherein the controller is further configured to initiate energy exchange between the first energy storage element and the second energy storage element to maintain a required state of charge in the second energy storage element.

34. A hybrid energy storage system as claimed in claim 33, further comprising a common point of coupling for connecting the first energy storage element and the second energy storage elements to the power system.

35. A method as claimed in claim 1, wherein the first energy storage element has a slow reaction time of at least ten seconds, and the second energy storage element has a short reaction time and is configured to reach a high output in less than one second.

36. A hybrid energy storage system as claimed in claim 7, wherein the slow energy storage system element has a slow reaction time of at least ten seconds, and the fast energy storage element has a short reaction time and is configured to reach a high output in less than one second.

* * * * *